(12) United States Patent
Trangsrud

(10) Patent No.: US 6,881,899 B1
(45) Date of Patent: Apr. 19, 2005

(54) PULLBOX ASSEMBLY

(76) Inventor: Julian P. Trangsrud, 300 Cherry St., Northfield, MN (US) 55057

( * ) Notice: Subject to any disclaimer, the term of this patent is extended or adjusted under 35 U.S.C. 154(b) by 0 days.

(21) Appl. No.: 10/953,851

(22) Filed: Sep. 29, 2004

(51) Int. Cl.[7] .................................................. H02G 3/08
(52) U.S. Cl. ............................. 174/50; 174/58; 174/63; 220/4.02; 439/535; 248/906
(58) Field of Search ............................. 174/50, 58, 63, 174/17 R; 220/4.02, 3.8; 361/600; 248/906; 439/535

(56) References Cited

U.S. PATENT DOCUMENTS

| | | | | |
|---|---|---|---|---|
| 2,477,131 A | * | 7/1949 | Jones, Jr. ..................... 174/58 |
| 2,477,132 A | * | 7/1949 | Rowe ......................... 174/52.1 |
| 3,238,426 A | * | 3/1966 | Bernstein .................... 257/724 |
| 3,363,797 A | * | 1/1968 | Roese ......................... 137/371 |
| 6,774,304 B1 | * | 8/2004 | Gretz .......................... 174/50 |
| 6,803,525 B1 | * | 10/2004 | Liao .......................... 174/135 |

\* cited by examiner

*Primary Examiner*—Dhiru R. Patel
(74) *Attorney, Agent, or Firm*—Nikolai & Mersereau, P.A.

(57) ABSTRACT

A pullbox assembly for use in wiring having a cylindrical pipe main body having a side wall with handles and or cable holders which double as wire holders for the inside of the pullbox main body and a flat base for stability of the pullbox in the ground. A metal casting frame attached to the rim of the main body by bolts through the sidewall. A cover fitting into the casting frame and optionally bolted thereto. The pullbox assembly can have a base, which is solid for keeping water and moisture out or the base may have a drainage hole for high water table applications to let water in and out. An extension may be added to the pullbox assembly to lengthen the main body for deeper holes in the ground. The pullbox assembly is easy to assemble on site. The cover has an indentation for attachment of different nameplates.

14 Claims, 4 Drawing Sheets

PULLBOX ASSEMBLY

BACKGROUND OF THE INVENTION

1. Field of the Invention

This invention relates to below ground pullboxes for semaphores and other electrical connections.

2. Description of the Related Art

Currently pullboxes are used which are made from a polyethylene pipe having a base, usually a square frame of four boards, resembling a picture frame, attached to the base of the base of the cylinder to help stabilize the pullbox in the hole it is placed into. Eyehook bolts are used on the inside diameter near the top to attach cables or ropes to for placing the pullbox in the ground. The eye of the eyehook bolt is adjacent the inside wall of the cylinder. No wire holders are found on the inside wall of the pullbox to support wires on the inside of the pullbox. No handles are used to move the pullbox.

An internal hoop is bolted to the polyethylene pipe near the top to act as an internal flange for supporting a cover, which is laid thereon. The pull boxes are labor intensive to assemble since the base, eyehook bolts and internal hoop are all hand assembled and bolted to the polyethylene pipe at the construction site.

Typically the pullboxes are made in one length and are not adjustable to fit different depth holes to reach wiring at different positions.

The covers on the pullboxes frequently are molded with labels on them indicating the contents of the pullbox so that different covers have to be stocked for the different purpose pullboxes.

SUMMARY OF THE INVENTION

A pullbox having a molded body with a cylindrical side wall and a concave base with an apertures for moisture and water table purposes. The pullbox having threaded inserts integral with the sidewall for threading eyehook bolts therein. The eyehook bolts providing internal handles along a mid portion of the cable holders integral with the sidewalls for hooks to lift the pullbox. The molded body has an upper rim for supporting a casting frame, which is bolted to the sidewall of the molded body. The casting frame optionally has arms having boltholes extending inside of the casting frame for bolting a cover thereon. The cover optionally has bolt apertures for connecting the cover to the casting frame. A recessed portion of the cover allows for inserting a label for the type of equipment housed in the pullbox so that only one cover needs to be made and then labeled on site for the use the pullbox is put to.

The flange near the cover can accept an extension section for the pullbox to extend the height thereof such that only one size pullbox need be made and extensions added thereto can adjust for the depth of the hole it is inserted into. The flange at the top can also support a casing frame which is bolted to the extension section.

The aperture in the base can let moisture in or out of the pullbox. If the water table becomes too high water can be let in and let water out when the water table drops.

Alternatively if there is no water table problem the base can be made without the aperture for a watertight or moisture barrier use.

The base of the pullbox being mostly flat and continuous except for the aperture allows for a stable base on the pullbox so that it does not tilt as readily after placing it in the hole in the ground as would a pipe like cylinder if one side of the ground is softer than the other side.

The pullbox is tapered so that one molded body can nest inside another for shipping and storage purposed.

The base of the pullbox has a concave center for increasing the strength of the base. The concave portions also nest when the molded bodies are stacked in nested fashion.

The eyehook bolts are screwed into threaded inserts integral with the molded body and can be used to help lift the pullbox or lower it into a hole in the ground. The eyehook bolts on the inside of the pullbox sidewall can be placed in any vertical position on the cylinder wall extended inward such that they can double as wire holders to support wires in the pullbox. Alternatively the eyehook bolts and wire holders can be separate units in the side of the cylindrical body placed at different heights for their different purposes.

The pullbox is molded in one piece with the base threaded inserts integral therewith and the casting frame is easily attached by bolts to the top of the pullbox to support the cover or an extension portion.

The extension portion is optionally bolted to the pullbox and has an inner diameter portion and an outer diameter portion so that it nests into the pullbox at one end and acts as a support for the casting frame on the other end.

OBJECTS OF THE INVENTION

It is an object of the invention to produce pullboxes with an intergral threaded insert for eyehook bolts and a base.

It is an object of the invention to eliminate hand assembly of a base on the pullbox.

It is an object of the invention to eliminate the need for a flange to be manually inserted and bolted to the inside circumference of the pullbox wall.

It is an object of the invention to provide a stable base for the pullbox.

It is an object of the invention to provide handles for the pullbox.

It is an object of the invention to provide extensions for the pullbox.

It is an object of the invention to provide a water table aperture in the base of the pullbox.

It is an object of the invention to provide a moisture aperture in the base of the pullbox.

It is an object of the invention to provide a pullbox with a solid base for a moisture barrier water tight use.

It is an object of the invention to provide a standard cover for the pullbox.

It is an object of the invention to provide a various cover labels for the pullbox cover.

It is an object of the invention to provide and easy to assemble casing frame for the pullbox.

It is an object of the invention to provide an easy to attach and remove cover for the pullbox.

It is an object of the invention to provide a pullbox with a strong cover and to support large weights thereon.

It is an object of the invention to provide a pullbox with a tapered nestable configuration for ease of storage and shipment and reducing storage volume.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
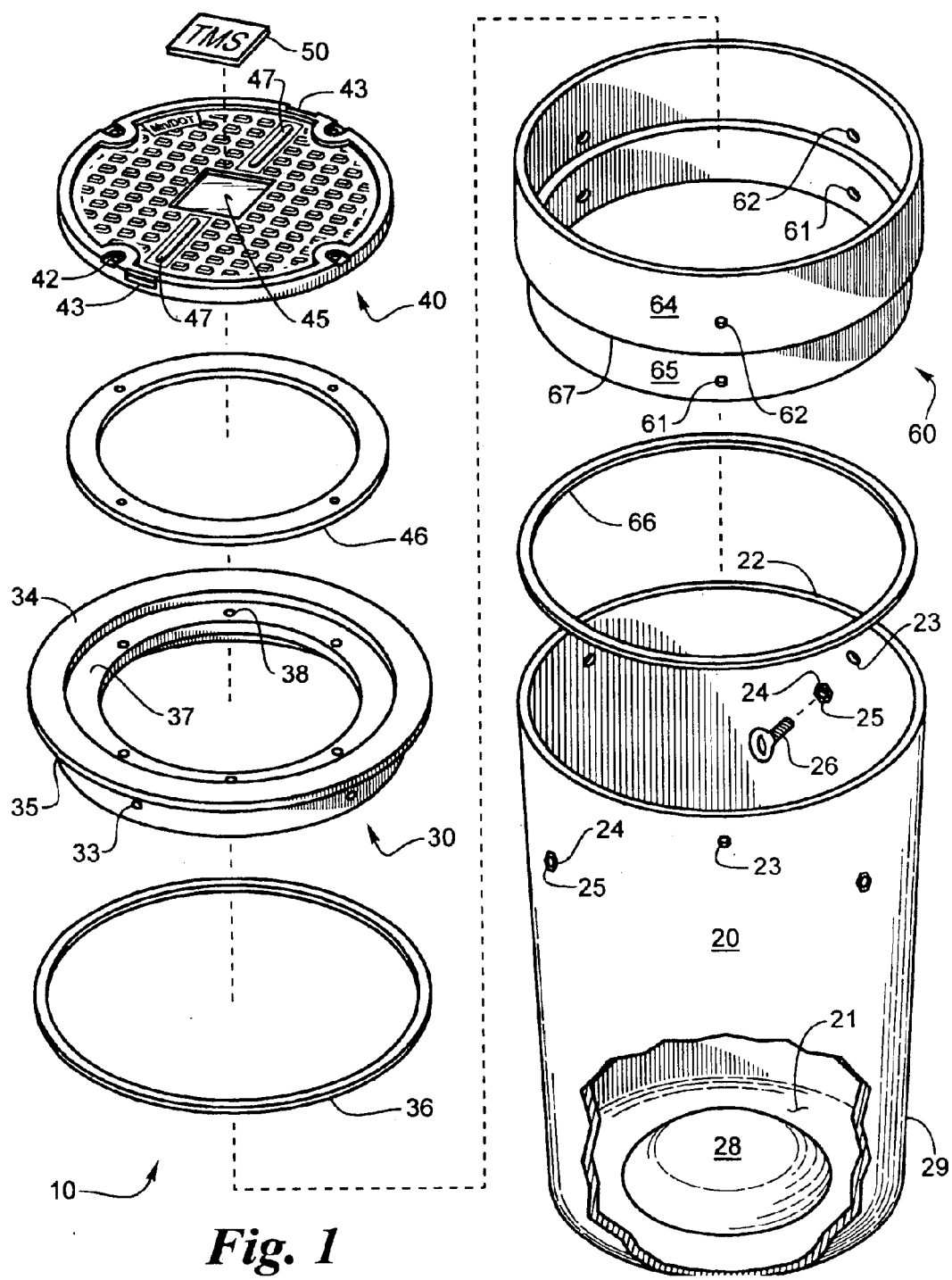
FIG. 1 is a perspective exploded view of the pullbox assembly with an extension section.

The pullbox assembly 10 has a cylindrical body 20, a casting frame 30, a cover 40, and optionally at least one extension 60. The casting frame 30 is bolted to the cylindrical body 20 and the cover 40 is optionally bolted to the casting frame 30 so the entire pullbox assembly 10 is integrally connected such that if one portion of the pullbox assembly 10 moves the entire pullbox assembly 10 moves. If optional extension 60 is used the extension 60 is optionally bolted to the pullbox assembly 10.

The pullbox assembly 10 as shown in FIG. 1 is for a watertight version of the pullbox assembly. It has a base 21 without any apertures for placing on the ground in a hole and will not admit water or let moisture in or out.

At an installation site a pullbox is used to protect wiring connections and provide access to those connections for initial installation, and later for maintenance or alterations. Typically wiring for semaphores, street lights, and other uses are connected inside of a protective enclosure buried in the ground with the wires to stop signals, street lights or other devices buried in the ground meeting in the pullbox assembly 10. Holes are drilled in the side of cylindrical body 20 to let wires inside of the pullbox assembly 10. The wires are then connected to each other or to equipment in the pullbox assembly 10. For waterproof or moisture proof pullbox assemblies 10 the wires and the cylindrical body 20 have a compound sealant applied to prevent leakage. In the waterproof or moisture proof embodiment shown in FIG. 1, gaskets 46 are used between the cover 40 and the casting frame 30, gasket 36 is used between the casting frame 30 and the cylindrical body 20 or optionally extension 60. Further, if the optional extension 60 is used gasket 66 is used between extension 60 and cylindrical box 20.

In a first embodiment the cylindrical body 20 is molded with a solid base 21 for supporting the cylindrical body 20 on a flat surface at the bottom of a hole. The solid base 21 does not allow water or moisture to pass in or out of the pullbox assembly 10 and provides a substantially flat base to rest the pullbox assembly on so that it does not sink into the hole, or tilt to one side as readily due to soft ground conditions. The sidewalls 29 of the cylindrical body 20 are tapered outward from the base 21 with a smaller diameter than the rim 22 such that the cylindrical bodies 20 can be nested one inside the other to save space during shipping and storage. The base 21 has a concave center portion 28 extending into the cylindrical body 20. The center portion 28 serves to strengthen the base 21 and the center portions 28 can nest in each other so as not to interfere with the nesting of the cylindrical bodies.

Figure 4:
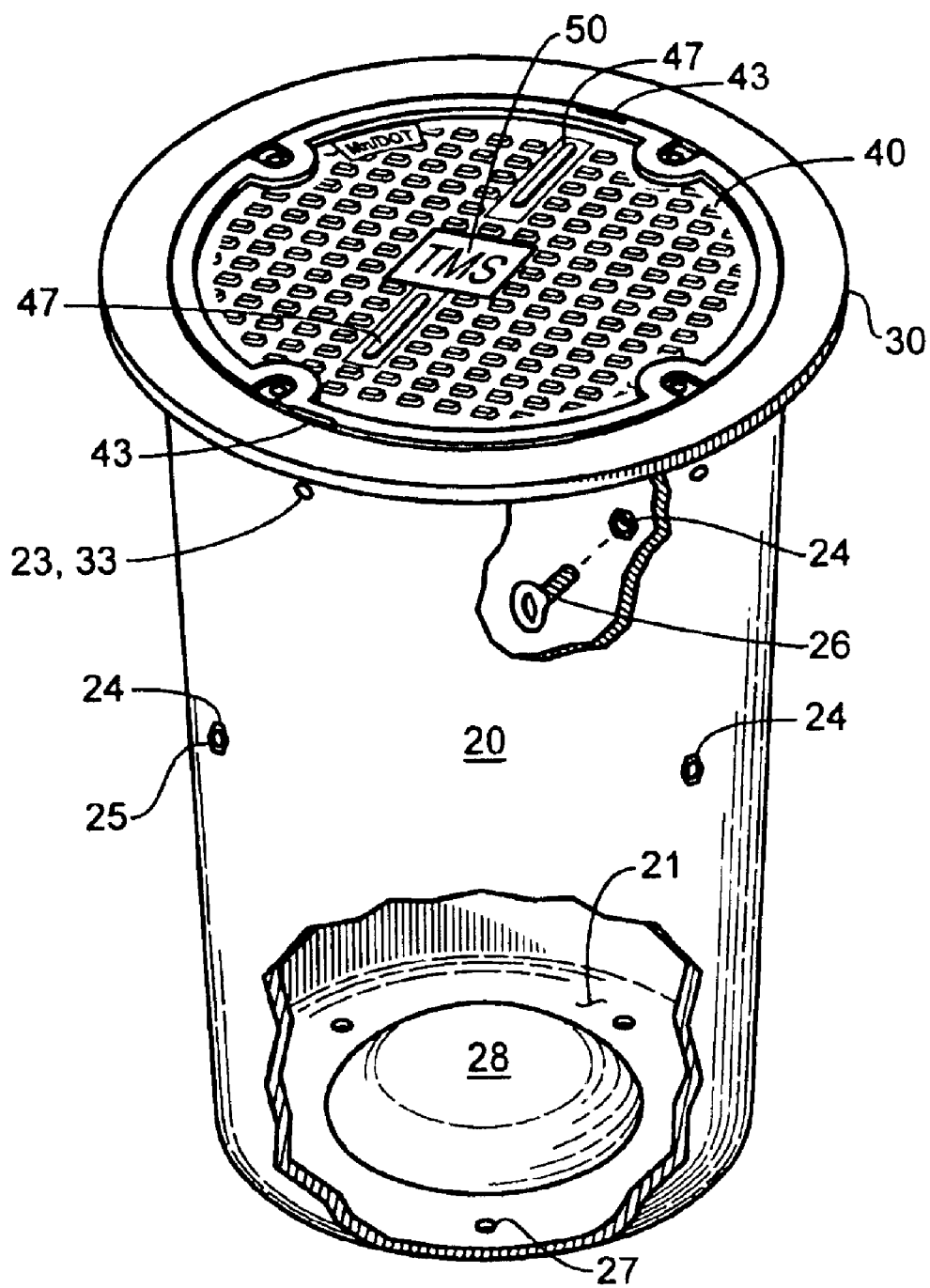
FIG. 4 is a perspective view of the pullbox assembly with a drainage hole in the base.
Figure 6:
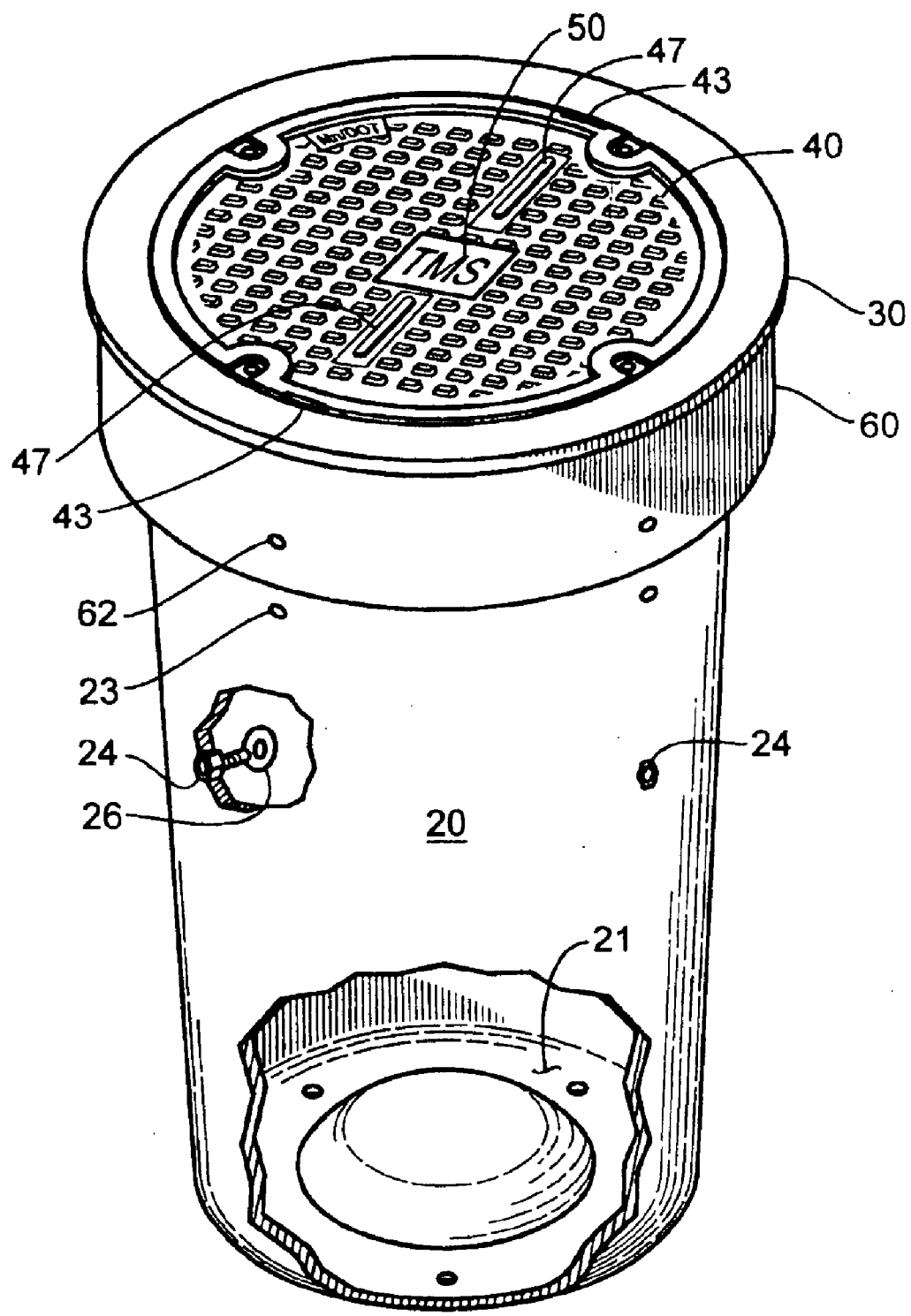
FIG. 6 is a perspective view of the pullbox assembly with an extension attached.

In an alternative embodiment as shown in FIG. 4 the base 21 has a drainage hole 27 such that groundwater can enter or leave the cylindrical body. If there were no drainage hole groundwater would tend to raise the cylindrical body 20 when the water table got high.

In a preferred embodiment the cylindrical body 20 has three eyebolts 26 in the side wall 29 of the cylindrical body 20 to facilitate lifting the cylinder body 20. Although three eyebolts are used in one preferred embodiment any number of eyebolts 26 can be used. The placement of the eyebolts can vary. The eyebolts can be used not only for lifting the cylindrical body but also for holding the wires or cables inside of the inbox at desired heights.

The cylindrical body 20 also has a rim 22 for providing a shelf for the casting frame 30. The casting frame 30 has a flange ring portion 34 for resting on top of the rim 22 of the cylindrical body 20 and seating ring portion 35 for nesting into the cylindrical body 20 and having an outer diameter just smaller than the inner diameter of the cylindrical body 20. A bolt passing through the bolt aperture 33 in the seating ring portion 35 of the casting frame 30 and the bolt aperture 23 in the cylindrical body 20 secures the cylindrical body 20 to the casting frame 30. The casting ring is preferably molded from a ductile iron or cast iron. The cylindrical body 20 is preferably molded from a polyethylene or plastic material.

Figure 2:
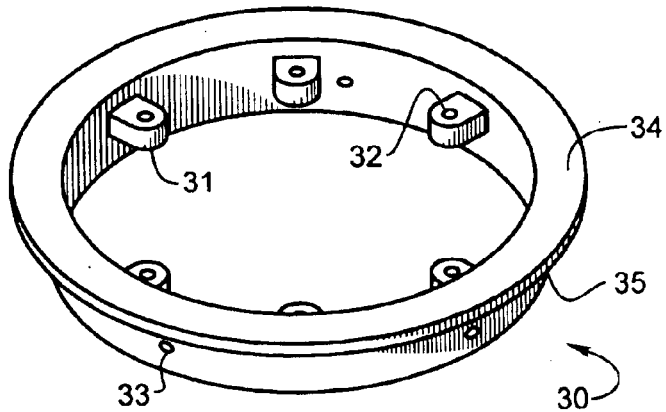
FIG. 2 is a perspective view of the pullbox casting frame.
Figure 3:
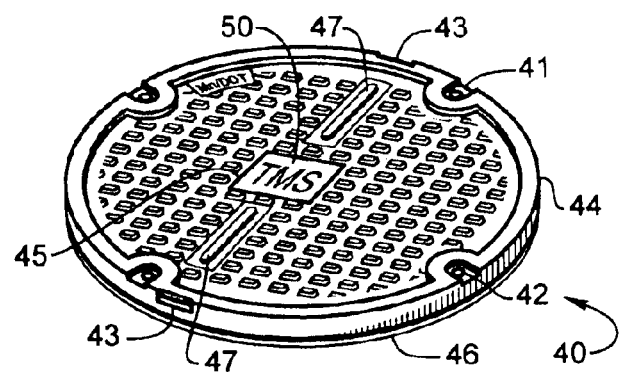
FIG. 3 is a perspective view of the cover casting.
Figure 5:
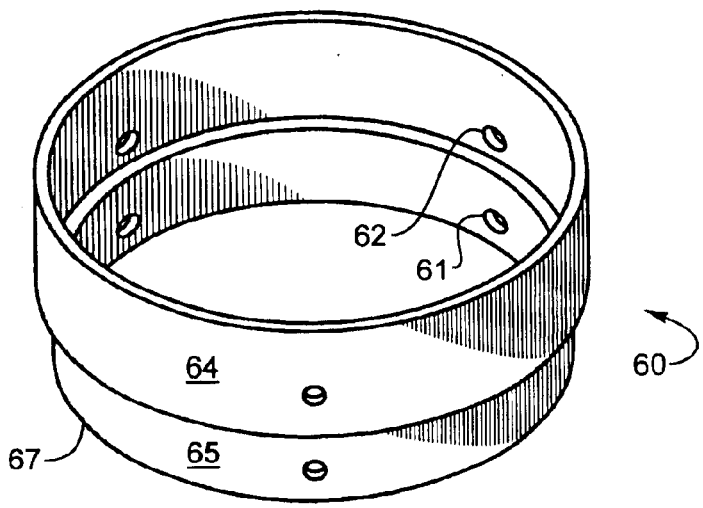
FIG. 5 is a perspective view of the extension for the pullbox assembly.

The casting frame 30 may have a flange 37 optionally with bolt apertures 38 as shown in the embodiment in FIG. 1 for engaging the cover 40, which has bolt apertures 42 for securing the cover to the casting frame 30 with bolts. The casting frame 30 may alternatively have bolt arms 31 with bolt apertures 32, as shown in FIG. 2, for securing the cover 40 by means of bolts though bolt apertures 42. The embodiment of the casting cover 30 with flange 37 is used in conjunction with moisture and water sealing gaskets 46 providing a seal between the cover 40 and the casting cover 30. Similarly a gasket 36 can be used for a moisture or water-sealing embodiment between the casting cover 30 and the cylindrical body 20.

The cover 40 may be made from a ductile iron or cast iron. The cover 40 may have a bolt recess portion 41 so that the bolts do not stick up over the cover and provide a hazard for traffic passing over the cover. The cover 40, and casting frame may have a highway department H10 rating for the loads it can carry when combined with and depending on the standard of the specifications for the pullbox to be used.

The cover 40 may have a tapered outer diameter 44 to allow for easier placement in casting frame 30.

The cover 40 may also have pry slots 43 for aid in lifting the cover 40 off of the casting frame 30. The cover 40 may also have a recessed portion 45 for insertion of a nameplate 50 to identify the equipment inside of the pullbox assembly 10. For example the label TMS is for Traffic Maintenance Signals or it may say Lighting or Signals. Having to stock only one set of covers 40 reduced inventory costs over having separately labeled covers with the labels molded into the covers. Different nameplates 50 can be stored at low cost. The nameplates can be secured to the covers 40 in numerous ways including bolting and gluing. The cover 40 may also have two lifting handles 47 at 180 degrees from each other along the same line as the pry slots 43.

In an alternative embodiment for a pullbox assembly 10 of a different height an extension 60 can be used to add to the height of pullbox assembly 10 making the pullbox fit into a hole which must be deeper to get down to the level of the wires buried in the ground. The extension 60 has an upper diameter ring portion 64 of a first diameter and a lower diameter ring portion 65 of a second diameter the two diameter ring portions integral with each other and forming a ledge portion 67 at the junction. The ledge portion 67 rests on the rim 22 of the cylindrical body 20. The lower diameter portion 65 nests into the cylindrical body 20 and the upper diameter portion 64 supports casting frame 30 with the seating ring portion 35 thereof nesting therein. Bolt apertures 61 in the lower diameter portion of the extension 60 align with bolt apertures 23 in the cylindrical body 20 to optionally allow the extension 60 to be secured by bolts to the cylindrical body 20. The upper diameter ring portion 64 is secured to the casting frame 30 by bolt apertures 62 aligning with bolt apertures 23 of the cylindrical body 20. If a moisture or waterproof connection is desired gasket 36 is installed between the casting frame 30 and the extension 60 and gasket 66 is installed between extension 60 and cylindrical body 20. In some embodiments more than one extension 60 can be used.

Obviously, many modifications and variations of the present invention are possible in light of the above teachings. It is therefore to be understood that, within the scope of the appended claims, the invention may be practiced otherwise than as specifically described.

What is claimed is:

1. A pullbox comprising:
   a pullbox hollow cylindrical body having a base, a side wall with a rim at the top, and an open top, the rim having an inner diameter and an outer diameter,
   the side wall having at lease one threaded insert imbedded therein,
   the side wall having a plurality of bolt apertures through the side wall proximate the rim,
   a casting frame having a hollow cylindrical body, a side wall with an inner diameter and two outer diameters, the first outer diameter forming a neck for insertion into the inner diameter of the pullbox cylindrical body, and a second outer diameter forming a base for resting on the rim of the pullbox cylindrical body, the diameter of the second outer diameter being larger then the first outer diameter,
   a plurality of bolt apertures through the casting frame hollow cylindrical body side wall in the neck which align with the bolt apertures in the side wall of the pullbox cylindrical body such that bolts passing therethrough secure the casting frame to the pullbox,
   a plurality of arms extending inward from the inside diameter of the casting frame each arm having a threaded bolt aperture,
   a cover in the shape of a disk having a plurality of bolt apertures and a diameter approximating the inside diameter of the casting frame such that the cover rests on the arms in the casting frame and the bolt holes align allowing the cover to be secured to the casting frame.

2. A pullbox as in claim 1 wherein:
   the plurality of arms extending from the inside diameter of the casting frame are continuous and form a flange around the inside of the casting frame, the flange having a plurality of threaded bolt apertures.

3. A pullbox as in claim 2 wherein:
   a gasket placed at the rim of the pullbox cylindrical body provides a water tight seal with the casting frame.

4. A pullbox as in claim 3 wherein:
   a gasket placed at the flange of the casting frame body provides a water tight seal with the cover.

5. A pullbox as in claim 3 wherein:
   the pullbox hollow cylindrical body side wall has a taper with the base smaller than the rim for nesting one pullbox within another.

6. A pullbox as in claim 1 wherein:
   a gasket placed at the rim of the pullbox cylindrical body provides a water tight seal with the casting frame.

7. A pullbox as in claim 1 wherein:
   the pullbox hollow cylindrical body base has a concave center portion for strengthening the base.

8. A pullbox as in claim 7 wherein:
   the pullbox hollow cylindrical body base has at least one aperture for allowing water to pass therethrough.

9. A pullbox as in claim 1 wherein:
   the pullbox hollow cylindrical body base has at least one aperture for allowing water to pass therethrough.

10. A pullbox as in claim 1 wherein: an extension having a hollow cylindrical body with a side wall, the cylindrical body of said extension having a first upper ring portion with a first outer diameter and a first inner diameter and a casting frame engaging portion having a second outer diameter and a second inner diameter, a plurality of bolt apertures through the side wall in the first upper ring portion and said plurality of bolt apertures through the side wall in the casting frame engaging portion such that the first upper ring portion fits inside of the pullbox cylindrical body and the bolt apertures line up for securing the pullbox cylindrical body to the extension, and the casting frame fits into the casting frame extension portion and the bolt apertures line up for securing the casting frame to the extension.

11. A pullbox as in claim 10 wherein:
    a gasket between the extension and the casting frame and a gasket between the extension and the pullbox cylindrical body provide a waterproof pullbox.

12. A pullbox as in claim 10 wherein:
    the pullbox hollow cylindrical body side wall has a taper with the base smaller than the rim for nesting one pullbox within another.

13. A pullbox as in claim 10 wherein:
    the pullbox hollow cylindrical body base has a concave center portion for strengthening the base.

14. A pullbox as in claim 10 wherein:
    the pullbox hollow cylindrical body base has at least one aperture for allowing water to pass therethrough.

* * * * *